Patented Jan. 9, 1945

2,367,122

UNITED STATES PATENT OFFICE 2,367,122

FLOTATION PROCESS

Edward Hammond Hoag, Los Angeles, Calif.

No Drawing. Application March 16, 1942,
Serial No. 434,830

3 Claims. (Cl. 209—166)

Have invented a new and useful flotation process for collecting colloids and minute crystalline aggregates found in clays, bentonites, montmorillonites having thixotropic and base exchange properties and separating them from lime, free silica, alkali earths and included impurities therein.

It is the object of this invention to improve the thixotropic properties of the minerals mentioned above and of their associated groups, that is, minerals possessing that property by virtue of which there is an isothermal transformation of gels (solid colloidal dispersions) to sols (liquid colloidal dispersions) whereby gels become semi-solid (coagulate) when at rest and fluid on agitation.

It is the object of the invention to improve deep well operations by improving the medium of viscosity and gel strength of thixotropic clays to withhold drilled materials from settling to the bottom of drill holes during suspension of operations, and then transforming said gels to sols to permit pumping after interruption of operations.

It is the object of the invention to improve the thixotropic properties of minerals or clays for continuous transition of stiffest paste to the most mobile suspension by separation of colloids from undesirable minerals in a flotation bath, aided by the scientific principles involved in the flotation process.

Another object of the invention is to use a practical pulp dilution (ratio of water to solids) that will give the most economical and efficient agitation and aeration of thixotropic minerals in a flotation bath, whereby colloids and suspensoids will be in continuous contact with air and reagents for collecting and frothing purposes.

Another object of the invention is to improve gel and sol qualities of minerals having thixotropic properties by introducing into a flotation bath colloidal negative ions, providing for the limit of monovalent cations to be introduced into the bath for the maximum capacity of base exchangers, depressing divalent cations of lime, magnesia and included impurities therein, and maintaining hydrogen ion concentration of the flotation bath at or near its isoelectric point or thereabouts.

The flotation method as set forth illustrates the results of the separation of thixotropic clays (colloidal - hydrous - aluminum - silicates) from lime, magnesia, alkali earths and included impurities therein by the following tests.

| Product | Weight per cent | Assays per ton of ore | | | | |
|---|---|---|---|---|---|---|
| | | $SiO_2$ | $Al_2O_3$ | $Fe_2O_3$ | CaO | MgO |
| Calc. head | 100 | 31.50 | 7.21 | 0.11 | 21.42 | 9.05 |
| Conc. | 45 | 59.14 | 14.21 | 0.005 | 1.90 | 2.60 |
| Midds. | 32 | 5.64 | 1.96 | 0.048 | 32.67 | 3.42 |
| Tails. | 23 | 13.40 | 0.80 | 0.40 | 43.95 | 29.50 |

| | Distribution per cent | | | | |
|---|---|---|---|---|---|
| | $SiO_2$ | $Al_2O_3$ | $Fe_2O_3$ | CaO | MgO |
| Calc. head | 100 | 100 | 100 | 100 | 100 |
| Conc. | 84.48 | 88.74 | 2.04 | 4.00 | 12.92 |
| Midds. | 5.73 | 8.70 | 13.99 | 48.81 | 12.09 |
| Tails. | 9.79 | 2.56 | 83.97 | 47.19 | 74.99 |

The pH value of the flotation bath 7.8 to 9.0

Reagents and conditioners used in test

| Reagents | Pounds per ton of ore | | | | |
|---|---|---|---|---|---|
| | Conditioner | Rougher | Cleaner No. 1 | Cleaner No. 2 | Total |
| Sodium tannate | 0.08 | 0.04 | | | 0.12 |
| Sodium silicate | 0.25 | 0.10 | 0.10 | 0.10 | 0.55 |
| Sodium hydroxide | 0.08 | 0.08 | 0.04 | 0.04 | 0.28 |
| Citric acid | 0.04 | 0.04 | 0.04 | 0.04 | 0.16 |
| Tannic acid | 0.04 | 0.04 | 0.04 | 0.04 | 0.16 |
| Octyl alcohol | | 0.08 | 0.08 | 0.04 | 0.20 |

The table gives the analysis of the different products obtained in said tests such as concentrates, middlings, assay values, weight percent and distribution percent for said minerals.

These results show that a very low grade calcium bentonite can be transformed into a high grade sodium bentonite closely approaching montmorillonite. That is, a natural mineral in the colloidal state with included impurities therein is changed into a product that is very desirable. Also, it shows the valuable properties of thixotropic clays, such as colloidal gel dispersions and colloidal sol dispersions, the maximum swelling of gel at rest and its fluid condition when agitated, and the characteristics for base exchangers.

The colloids are negative minerals, that is, take a negative electrical sign when suspended in a flotation bath. The octyl alcohol is introduced for collecting and frothing purposes. The citric and tannic acids are conditioners and furnish the negative ions to the bath and depress lime and magnesia. The sodium silicate serves to depress free silica and exchange its monovalent cation sodium for the calcium ions of the mineral and the caustic soda furnishes the positive ions or strong electro-positive monovalent bases in exchange for calcium and magnesium cations contained therein.

The pulp dilution for agitation and flotation purposes was approximately 15 to 1 (water to solids). High grade bentonite generally absorbs about 13 to 15 times its weight of water. A pulp dilution of less than 12 to 1 in some cases is difficult to beneficiate by flotation.

The most favorable condition for a flotation bath to maintain the maximum swelling property of gel is approximately a pH value of 7.8, although thixotropic properties of clays can be maintained in a bath up to pH 9.0.

The action of sodium hydroxide on bentonite (crude) is a simple exchange of cations whereby sodium bentonite and water are formed. Sodium is the monovalent metal which makes one of the strongest gels in the shortest time and at lowest concentration of the monovalent base exchangers.

Hydrogen bentonite when once dried will not respond to thixotropic properties to the degree of swelling of the metallic bentonites.

The objectives for good bentonite is to provide for a ratio of silica to alumina of about 2 to 1 respectively and the deficiency made up by sodium or potassium metallic cations.

The ionization of colloidal clays decrease in the following order:

For monovalent cations, sodium, <potassium, <ammonia, <hydrogen.
For divalent cations, magnesium, <calcium, <strontium and <barium.

Temperatures, hydrogen ion concentration and soluble salts have important effects on the swelling of gels.

Crude bentonites, montmorillonites, beidellites and many other thixotropic clays very often contain lime, free silica, alkaline earths and included impurities, such as titanium and manganese oxides which automatically retard exchange of replaceable bases or cations therein and seriously affect viscosity of sols and swelling properties of gels.

Thixotropic clays like montmorillonites and bentonites contain a high percentage of colloids and when suspended in a flotation bath take a strong negative electrical sign on their surface, which is highly important. Other electrical signs which play important roles in the flotation of said minerals, that is, for the mineral-and-film-entity and the air-oil-bubble-entity are as follows: The film of the air-oil-bubble-entity takes a negative electrical sign in an alkaline bath, the effective ions introduced from the air are positive, the conditioners introduced furnish negative ions and the reagents introduced furnish positive ions, and likewise, are capable of activating said colloids while at the same time depress lime, free silica and undesirable minerals. These electrical signs explain satisfactorily the reason why negative ions of said colloids adsorb positive reagents, the importance of selecting base exchangers with the proper electrical sign and valency, the reason for having the flotation bath slightly alkaline or near its isoelectric point or thereabouts and for introducing replaceable bases of monovalent cations which are strongly electro-positive in exchange for divalent and multivalent cations which are less electro-positive.

It explains the mobility of microcrystalline elements (motion of atoms, molecules, ions and colloidal particles), the strong negative electrical charge on the colloids, and the adsorbing phenomena of ions (atoms plus electrical charges) and molecules.

Also the present invention involves the following phenomena: Silicates belonging to the colloidal or infinitesimal crystalline type of minerals, such as montmorillonite ($Mg.Ca.O.Al_2O_3.5SiO_2.8H_2O$), beidellite ($(Ca.Mg.) O.Al_2O_3.3SiO_2.4H_2O$), bentonite and thixotropic clays, have the property of holding in a loose manner cations in and around said microcrystalline aggregates by physico-chemical means. The number of undesirable cations (Ca, Mg, alkali earths, and various oxides found included therein) are exchanged for desirable cations (Na, K, and H, and alkali metals) and often dependent upon replaceable bases introduced into a flotation bath and contained therein. An increase in sodium or potassium cations will increase thixotropic properties of the above minerals to the limit of the maximum capacity that said minerals possess for exchange of said cations, if at the same time, calcium bases, free silica and included impurities are depressed. Divalent and multivalent cations are depressed by sodium tannate or tannic acid or by any of its derivatives or by citric acid together with sodium hydroxides and then monovalent sodium cations replace or are exchanged for the original calcium base in the crystalline structure. Free silica is depressed by sodium silicate and monovalent sodium cations enter the complex lattice nature of the gel. Hexametaphosphates act similarly to sodium tannates as dispersing agents with the sodium replacing the calcium base. The pH value of the bath corresponding to the isoelectric point offers the most favorable condition for exchange of bases for the colloidal dispersing quality of gels and the colloidal dispersing quality of sols.

Carbonaceous base exchangers act similarly to hydrogen base exchangers on thixotropic minerals in the presence of calcium and magnesium cations by exchange of the calcium and magnesium cations for the hydrogen cations or in turn exchanged for desirable sodium or potassium cations which enter into the colloidal and complex microcrystalline loose lattice structure of said minerals.

Colloidal-hydrous-aluminum-silicates are activated and collected into a flotation froth as gels and sols without impairing the thixotropic properties of said minerals or colloids, by octyl alcohol

although there are several other reagents of the hydroxyl group which serve for collecting and frothing purposes, so the patent should not be understood to be limited to the use of octyl alcohol exclusively.

A typical analysis of montmorillonite is as follows:

| | Per cent |
|---|---|
| SiO₂ | 61.68 |
| Fe₂O₃ | 4.28 |
| ¹R₂O₃ | 24.68 |
| CaO | 0.24 |
| MgO | 2.60 |
| Na₂O | 0.21 |
| K O | |
| SO₃ | 0.08 |

¹ Includes Al₂O₃, TiO₂, Mn₃O₄, and P₂O₃.

The undesirable cations in thixotropic clays are Ca, Mg, TiO₂, Mn₃O₄, and included impurities and oxides.

The desirable cations are sodium, potassium and hydrogen (sometimes inactive).

The desirable electrical sign of the hydrous-colloidal-aluminum-silicates is negative.

The desirable reagents for activation belong to the hydroxyl group and the pH value of the flotation bath is maintained at the isoelectric point or near to neutrality or thereabouts.

The thixotropic clays or minerals referred to above are understood to mean those minerals or clays having thixotropic properties, that is, that property by virtue of which certain gels become semi-solid (coagulate) when left at rest and become fluid on agitation.

The following chemical equations illustrate a few of the possibilities of the base or cation exchange properties of minerals as previously described:

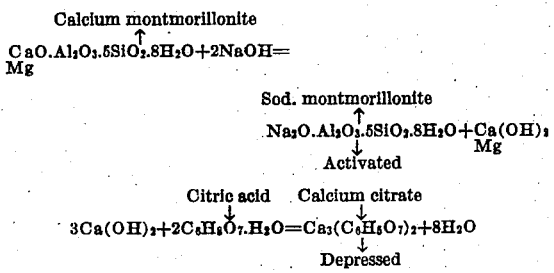

Hydrogen base exchangers

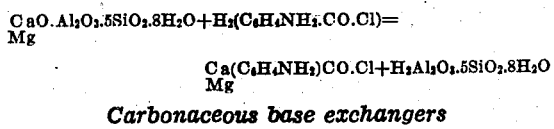

Carbonaceous base exchangers

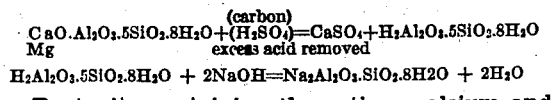

Bentonite containing the cations calcium and magnesium, in contact with a sodium salt and an acid radical, or an acid such as citric or tannic acids and caustic soda exchange their cations and the less positive calcium bases are replaced by the strong electro-positive sodium bases.

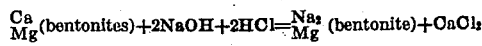

Citric or tannic acids could replace HCl in this equation.

Likewise, sodium bentonite in contact with calcium carbonates in an alkaline bath exchange sodium bases for calcium cations as follows:

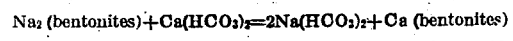

It is evident that the novelty of the invention can be summarized as follows: The base exchangers introduced into the flotation bath exchange their sodium, potassium or hydrogen cations for the calcium, magnesium cations and impurities included in the crude mineral. The sodium-colloidal-hydrous-aluminum-silicates resulting from the base exchanging, is activated by hydroxyl reagents and collected in a flotation froth. The divalent and multivalent cations such as calcium and magnesium are depressed by reagents or conditioners. The thixotropic properties of colloidal dispersing gels and colloidal dispersing sols are maintained by control of the pH value of the flotation bath, the valency of the replaceable bases, the ratio of silica loose lattice structure to the aluminum complex aggregates, the concentration of negative colloids and the electrical sign on the surface of minerals and the electrical sign of the effective ions furnished by the conditioners and reagents.

The process improves and purifies a colloidal alumino-silicate clay which contains replaceable alkali-earth-metals by preparing an aqueous suspension of the colloidal clay in the presence of a soluble alkali-metal salt, so that alkali-earth-metal in the clay is replaced by alkali-metal by a cation exchange reaction giving a clay fraction containing a larger amount of alkali-metal and less alkali-earth-metal than the original and separating this fraction from the suspension by froth flotation in the presence of octyl alcohol and a depressant for multivalent cations chosen from the group consisting of tannic acid and citric acid and their alkali-metal salts. The advantage being that this process obtains an alkali-metal-bentonite from the raw material in a single operation and that the sodium bentonite has greater thixotropic property in aqueous suspension, as in drilling mud.

This new flotation method as set forth beneficiates crude or natural bentonites or colloidal-hydrous-silicates of alumina having cations of alkali-metal or alkali-earth-metals adsorbed thereto, by the flotation process and base exchange reactions in a single operation in the presence of a soluble ionizable salt of Na, K, Ca, Mg, or a basic hydroxide respectively, octyl alcohol and depressants to depress cations of the original clay. For example, by application of base exchange reactions and the flotation process to crude calcium bentonite in the presence of a soluble ionizable sodium salt (NaCl) and octyl alcohol and a depressant such as citric acid the following changes take place namely, the monovalent cations (Na) are adsorbed by the strong negative radical of the colloidal-clays and which in turn are activated and collected as a concentrate in a flotation froth. The exchangeable multivalent cations (CaO) of the original clay are depressed as calcium chloride and with impurities which are associated with said clays such as silica, heavy iron oxides, are depressed and removed from the flotation bath as tails. The separation of sodium cations adsorbed to the activated colloidal clays from multivalent cations such as CaO and the depressed impurities is practically complete.

Likewise, alkali-earth-metal colloidal clays are improved by the flotation process and base exchange reactions by substituting alkali-earth-metals for the original alkali-metals fraction in suspension and in the presence of ionizable calcium or magnesium hydroxides and their allied basic salts, octyl alcohol and a depressant for the alkali-metals.

Likewise, hydrogen bentonite clays are improved by base exchange reactions and the flotation process by activating the hydrogen ion cations adsorbed to the colloidal clays in the presence of octyl alcohol, tribasic acids selected from the group of citric acid and tannic acid and a depressant as described.

In general, the dispersive property of colloidal clay is improved by base-exchange reactions and the flotation process for drilling muds by improving the gel-strength, density and viscosity of said muds. The strong negative charge on colloidal clays are made stronger by improving the dispersive qualities by which they hold cations more tenaciously and in this manner prevent easy disintegration of said clays when in contact with toxic minerals or chemicals. Being stronger clays they adsorb water more readily, hydrolyze better, and contribute to the increased swelling of this new product and which is generally recognized as a valuable property for thixotropic clay. Likewise, the preponderance of highly hydrated colloidal material with its wide range of particle size, enables the concentrated colloids (dispersing agents) to improve the suspending power of drilling muds.

I claim:

1. A froth flotation process for hydrogen bentonite which comprises subjecting a pulp of the ore to be separated to agitation and aeration in the presence of octyl alcohol and a tri-basic acid selected from the group consisting of tannic and citric acid and their allied alkali-metal salts.

2. A flotation process to improve and purify a colloidal alumino-silicate clay, which contains replaceable alkali-earth-metals by preparing an aqueous suspension of the colloidal clay in the presence of a soluble alkali-metal salt, so that alkali-earth-metal in the clay is replaced by alkali-metal by cation exchange reaction, giving the clay fraction containing a larger amount of alkali-metal and less alkali-earth-metal, than the original and separating this fraction from the suspension by froth flotation in the presence of octyl alcohol and a depressant for multivalent cations, chosen from the group consisting of tannic acid, citric acid and their alkali-metal salts.

3. A froth flotation process to purify and improve bentonite, montmorillonite, beidellite and colloidal hydrous-silicates-of-alumina-clays, which comprises subjecting a pulp of the ore to be separated to agitation and aeration, preparing an aqueous suspension in the presence of octyl alcohol to separate a flotation concentrate from the suspension, in the presence of sodium silicate, of a depressant chosen from the group consisting of tannic and citric acid and their allied alkali-metal salts, removing the depressed mineral fraction, free silica, iron oxides, and impurities included therein, as tails.

EDWARD H. HOAG.